United States Patent
Sugawara (10) Patent No.: US 10,281,691 B2
(45) Date of Patent: May 7, 2019

(54) LENS DRIVE DEVICE, CAMERA MODULE, AND CAMERA-MOUNTING DEVICE

(71) Applicant: Masayoshi Sugawara, Tokyo (JP)

(72) Inventor: Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 8 days.

(21) Appl. No.: 15/539,358

(22) PCT Filed: Dec. 24, 2015

(86) PCT No.: PCT/JP2015/006422
§ 371 (c)(1),
(2) Date: Jun. 23, 2017

(87) PCT Pub. No.: WO2016/103697
PCT Pub. Date: Jun. 30, 2016

(65) Prior Publication Data
US 2018/0246296 A1    Aug. 30, 2018

(30) Foreign Application Priority Data
Dec. 25, 2014  (JP) ................ 2014-262814

(51) Int. Cl.
*G02B 27/64*    (2006.01)
*G02B 13/00*    (2006.01)
(Continued)

(52) U.S. Cl.
CPC ............ *G02B 13/005* (2013.01); *G02B 7/04* (2013.01); *G02B 7/09* (2013.01); *G02B 27/646* (2013.01);
(Continued)

(58) Field of Classification Search
CPC .......... G02B 27/646; G02B 7/08; G02B 7/09; G02B 27/64; G03B 2205/0015;
(Continued)

(56) References Cited

U.S. PATENT DOCUMENTS 7,675,565 B2 *   3/2010   Cheng .................. G02B 7/08
                                                    348/357
7,881,598 B1 *   2/2011   Wu ...................... G03B 17/00
                                                    396/133
(Continued)

FOREIGN PATENT DOCUMENTS

JP    2013-104967 A    5/2013
JP    2013-210550 A   10/2013

OTHER PUBLICATIONS

International Search Report from International Application No. PCT/JP2015/006422 dated Mar. 15, 2016.

*Primary Examiner* — William R Alexander
*Assistant Examiner* — Balram T Parbadia
(74) *Attorney, Agent, or Firm* — Brundidge & Stanger, P.C.

(57) ABSTRACT

A lens drive device is provided with: an AF drive unit that has an AF coil unit and an AF magnet unit and automatically carries out focusing by moving an AF movable unit with respect to an AF fixed unit, making use of drive force from a voice coil motor; and a base unit disposed with an intervening space on the image formation side of the AF drive unit in the direction of the optical axis. The AF drive unit has elastic support units connecting the AF movable unit and the AF fixed unit. The AF movable unit is affixed to the AF fixed unit by being pressed upward to the light receiving side in the direction of the optical axis by the AF magnet unit and urged toward the image formation side in the direction of the optical axis by the elastic support units.

6 Claims, 8 Drawing Sheets

(51) Int. Cl.
*G02B 7/04* (2006.01)
*G03B 5/00* (2006.01)
*H04N 5/225* (2006.01)
*H04N 5/232* (2006.01)
*G02B 7/09* (2006.01)
*G03B 5/06* (2006.01)
*G03B 13/36* (2006.01)
*H02K 41/035* (2006.01)

(52) U.S. Cl.
CPC .......... *G03B 5/00* (2013.01); *G03B 5/06* (2013.01); *G03B 13/36* (2013.01); *H02K 41/0356* (2013.01); *H04N 5/225* (2013.01); *H04N 5/2254* (2013.01); *H04N 5/2257* (2013.01); *H04N 5/232* (2013.01); *G03B 2205/0023* (2013.01); *G03B 2205/0069* (2013.01)

(58) Field of Classification Search
CPC .... G03B 2205/0069; G03B 3/10; G03B 5/00; G03B 13/36; H04N 5/2254; H04N 5/2328; H04N 5/2257
See application file for complete search history.

(56) References Cited

U.S. PATENT DOCUMENTS

| | | | |
|---|---|---|---|
| 2006/0280492 A1* | 12/2006 | Chang | G03B 13/36 396/133 |
| 2007/0047942 A1* | 3/2007 | Chang | G02B 7/08 396/133 |
| 2013/0016427 A1* | 1/2013 | Sugawara | G02B 7/08 359/557 |
| 2013/0016428 A1* | 1/2013 | Sugawara | G02B 7/08 359/557 |
| 2013/0050828 A1* | 2/2013 | Sato | G02B 27/64 359/557 |
| 2016/0054578 A1* | 2/2016 | Dong | G02B 27/646 359/557 |

* cited by examiner

LENS DRIVE DEVICE, CAMERA MODULE, AND CAMERA-MOUNTING DEVICE

TECHNICAL FIELD

The present invention relates to an auto-focusing and shake-correcting lens driving device, a camera module having an auto-focusing function and a shake-correcting function, and a camera mounting device.

BACKGROUND ART

In general, a small-sized camera module is mounted in a mobile terminal such as a smartphone. In such a camera module, a lens driving device is employed (for example, PTL 1). The lens driving device has an auto-focusing function of automatically performing focusing for capturing a subject (hereinafter referred to as "AF (Auto Focus) function"), and a shake-correcting function (hereinafter referred to as "OIS (Optical Image Stabilization) function") of correcting shake (vibration) upon capturing an image to reduce the irregularities of the image.

The auto-focusing and shake-correcting lens driving device includes an auto-focusing driving part (hereinafter referred to as "AF driving part") for moving the lens part in the light axis direction, and a shake-correcting driving part (hereinafter referred to as "OIS driving part") for swaying the lens part in a plane orthogonal to the light axis direction.

The AF driving part includes, for example, an auto-focusing coil part (hereinafter referred to as "AF coil part") disposed around the lens part, and an auto-focusing magnet part (hereinafter referred to as "AF magnet part") disposed separately from the AF coil part in the radial direction. Automatic focusing is performed by moving an AF movable part including the lens part and the AF coil part with respect to an AF fixing part including the AF magnet part in the light axis direction with use of a driving force of a voice coil motor composed of the AF coil part and the AF magnet part, for example.

Here, a lens position for bringing a subject at a smallest capture distance (a position on the most light reception side) into focus is called "macro position," and a lens position for bringing a subject at the infinity (a position on the most imaging side) into focus is called "infinity position." That is, the range from the macro position to the infinity position is the movable range of the AF movable part.

The OIS driving part includes a shake-correcting magnet part (hereinafter referred to as "OIS magnet part") disposed at the AF driving part, and a shake-correcting coil part (hereinafter referred to as "OIS coil part") disposed separately from the OIS magnet part in the light axis direction, for example. A shake correction movable part (hereinafter referred to as "OIS movable part") including the AF driving part and the OIS magnet part is supported by a supporting member so as to be separated from a shake-correcting fixing part (hereinafter referred to as "OIS fixing part") including the OIS coil part in the light axis direction. The OIS movable part is swayed in a plane orthogonal to the light axis direction by use of a driving force of a voice coil motor composed of the OIS magnet part and the OIS coil part, and thus shake correction is performed (so-called barrel shift system). The OIS magnet part can also serve as the AF magnet part, and with such a configuration, the size and the height of the lens driving device can be reduced.

In the lens driving device disclosed in PTL 1, an elastic supporting part (an upper leaf spring and a lower leaf spring) connects a lens holder (as a part of the AF movable part) in which the AF coil part is disposed at the outer peripheral surface, with a magnet holder (as a part of AF fixing part) in which the AF magnet part (which also serves as the OIS magnet part) is disposed. At the time of focusing, the AF movable part moves in the light axis direction until the driving force (driving power) of the voice coil motor of the AF driving part and the restoration force of the elastic supporting part are equivalent to each other, and the AF movable part is held in that state. Accordingly, a driving force corresponding to the restoration force of the lower leaf spring and the upper leaf spring in the maximum displacement state is required for the voice coil motor of the AF driving part.

In addition, in the lens driving device disclosed in PTL 1, in an non-energization state where focusing is not performed, the lens holder is pushed up to the light reception side in the light axis direction with a spacer disposed on the imaging side of the lower leaf spring, and a back tension is caused in the upper leaf spring and the lower leaf spring (see FIG. 2 of PTL 1). That is, the AF movable part is held at the infinity position in a non-energization state where focusing is not performed, and is moved toward the macro position in an energization state where focusing is performed.

CITATION LIST

Patent Literature

PTL 1
Japanese Patent Application Laid-Open No. 2013-210550

SUMMARY OF INVENTION

Technical Problem

In recent years, along with reduction in thickness of the mobile terminals, further reduction in size and height of camera modules is desired. However, it is difficult to achieve further reduction in size and height of camera modules with the above-described conventional structure.

An object of the present invention is to provide a lens driving device, and a camera module and a camera mounting device including the lens driving device which can achieve further reduction in size and height.

Solution to Problem

A lens driving device according to an embodiment of the present invention includes: an auto-focusing driving part including an auto-focusing coil part disposed at a periphery of a lens part, and an auto-focusing magnet part disposed separately from the auto-focusing coil part in a radial direction, the auto-focusing driving part being configured to perform automatic focusing by moving, with respect to an auto focus fixing part including the auto-focusing magnet part, an auto focus movable part including the auto-focusing coil part in a light axis direction by use of a driving force of a voice coil motor composed of the auto-focusing coil part and the auto-focusing magnet part; and a base part disposed separately from the auto-focusing driving part at a position on an imaging side in the light axis direction. The auto-focusing driving part includes an elastic supporting part configured to connect the auto focus movable part and the auto focus fixing part, and the auto focus movable part is fixed to the auto focus fixing part in a state where the auto focus movable part is pushed up by the auto-focusing magnet part to a light reception side in the light axis direction, and biased by the elastic supporting part to the imaging side in the light axis direction.

A camera module according to an embodiment of the present invention includes: the above-mentioned lens driving device; a lens part mounted to the auto focus movable part; and an image capturing part configured to capture a subject image imaged with the lens part.

A camera mounting device according to an embodiment of the present invention is an information apparatus or a transport apparatus, the above-mentioned camera mounting device including the camera module.

Advantageous Effects of Invention

According to the present invention, the spacer in the conventional structure is unnecessary, and accordingly, the distance between the auto focus movable part and the base part can be reduced. Thus, further reduction in size and height of the lens driving device can be achieved.

DESCRIPTION OF EMBODIMENT

Figure 1A:
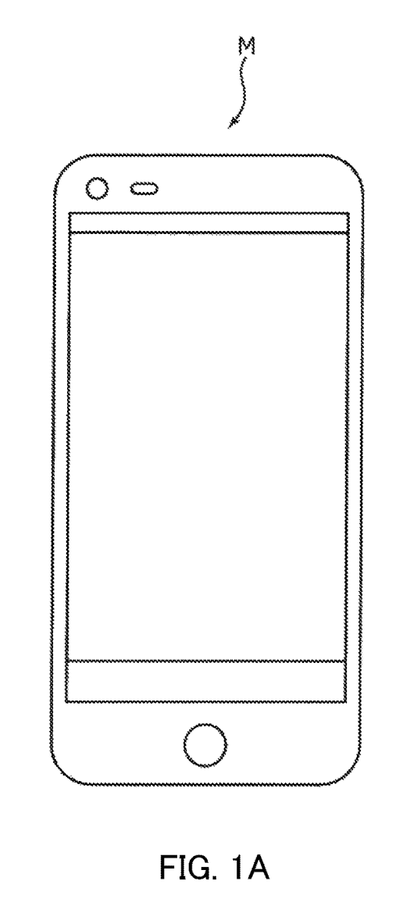
FIGS. 1A and 1B illustrate a smartphone in which a camera module according to an embodiment of the present invention is mounted.
Figure 1B:
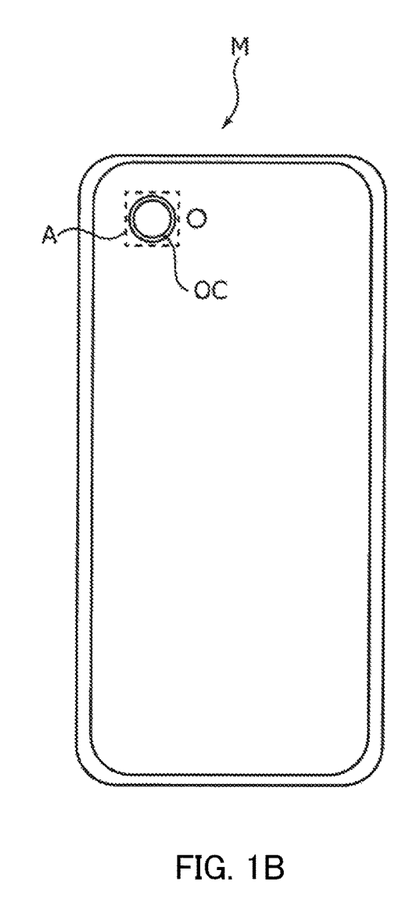

In the following, an embodiment of the present invention is described in detail with reference to the drawings. FIGS. 1A and 1B illustrate smartphone M in which camera module A according to the embodiment of the present invention is mounted. FIG. 1A is a front view of smartphone M, and FIG. 1B is a rear view of smartphone M.

For example, smartphone M is provided with camera module A as a back side camera OC. Camera module A has an auto-focusing function and a shake-correcting function, and can capture an image without image blurring by automatically performing focusing at the time of capturing a subject, and by optically correcting shake (vibration) at the time of capturing an image.

Figure 2:
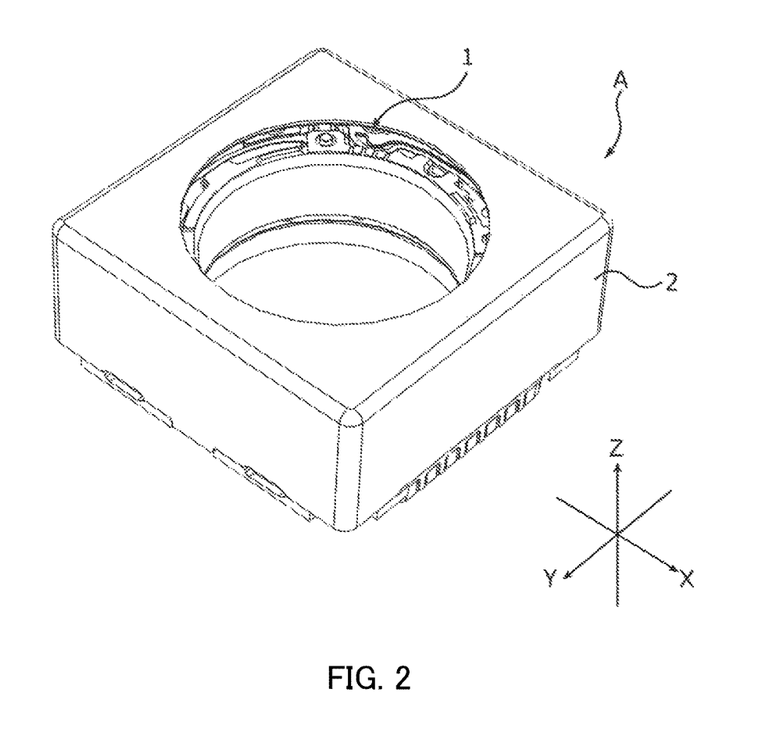
FIG. 2 is a perspective view of an external appearance of the camera module.
Figure 3:
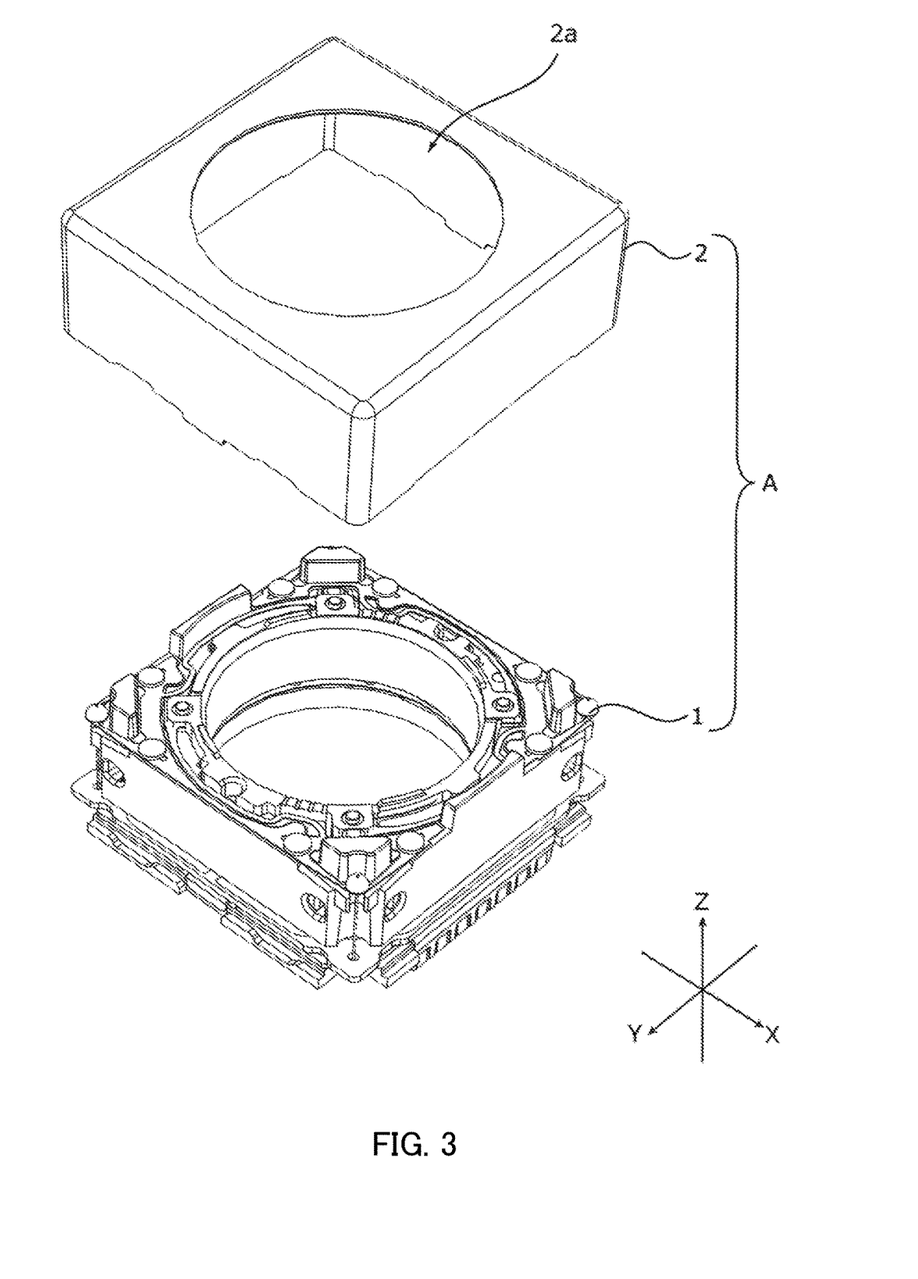
FIG. 3 is an exploded perspective view of the camera module.

FIG. 2 is a perspective view of an external appearance of camera module A. FIG. 3 is an exploded perspective view of camera module A. As illustrated in FIG. 2 and FIG. 3, descriptions will be made with an orthogonal coordinate system (X, Y, Z) in the present embodiment. Also in FIG. 4 to FIG. 7B described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the light axis direction, the upper side in the drawing is the light reception side in the light axis direction (also referred to as "macro position side"), and the lower side is the imaging side in the light axis direction (also referred to as "infinity position side").

Camera module A includes a lens part (not illustrated) in which a lens is housed in a lens barrel having a cylindrical shape, AF and OIS lens driving device 1, an image capturing part (not illustrated) that captures a subject image imaged with the lens part, shield cover 2 that covers the entirety, and the like.

As viewed in the light axis direction, shield cover 2 is a capped square cylindrical body having a square shape in plan view. Circular opening 2a is formed in the top surface of shield cover 2. A lens part (not illustrated) is exposed to the outside through opening 2a. Shield cover 2 is fixed to base member 23 (see FIG. 6) of OIS fixing part 20 of lens driving device 1. Shield cover 2 has conductivity. Shield cover 2 is electrically connected with first ground terminal 22c of OIS fixing part 20, and grounded.

The image capturing part (not illustrated) includes an imaging device (not illustrated), and is disposed on the imaging side in the light axis direction of the lens driving device 1. The imaging device (not illustrated) is composed of, for example, a CCD (charge coupled device) image sensor, a CMOS (complementary metal oxide semiconductor) image sensor, or and the like. The imaging device (not illustrated) captures a subject image imaged by a lens part (not illustrated).

Figure 4:
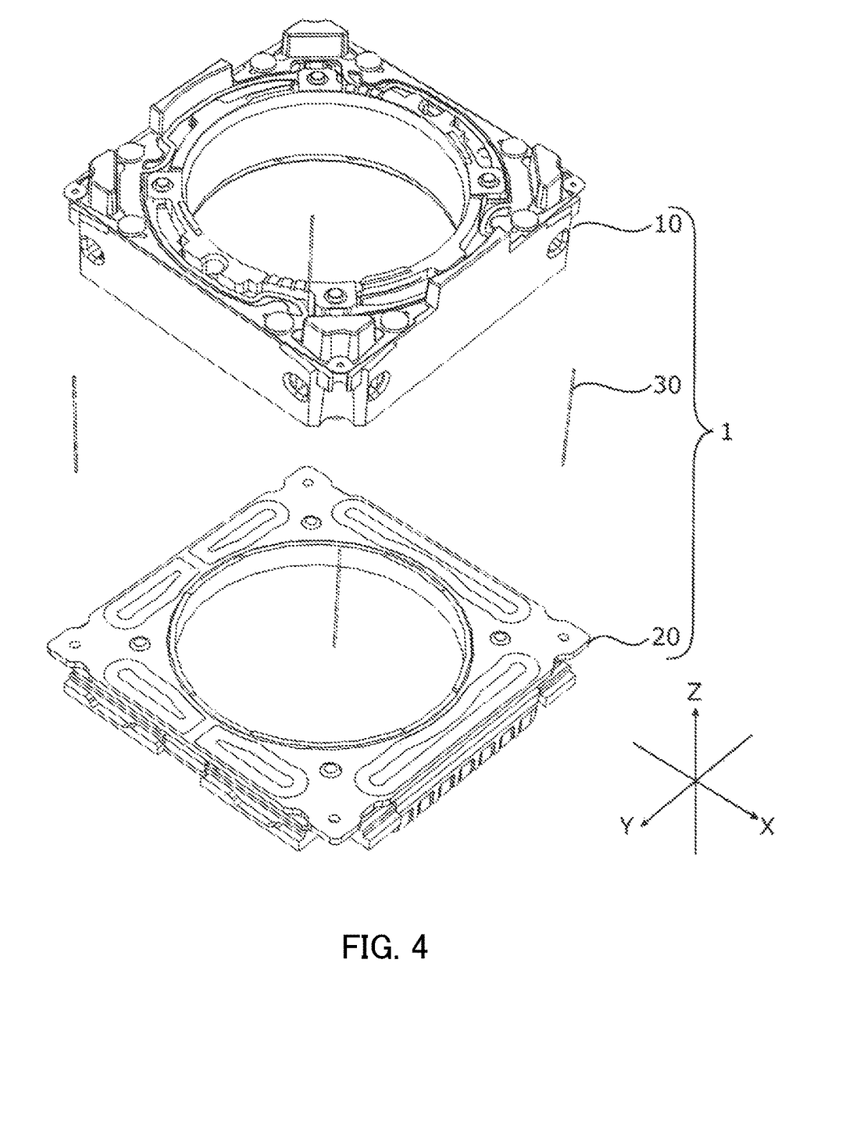
FIG. 4 is an exploded perspective view of a lens driving device.

FIG. 4 is an exploded perspective view of lens driving device 1. As illustrated in FIG. 4, lens driving device 1 includes OIS movable part 10, OIS fixing part 20, supporting member 30 and the like.

OIS movable part 10 includes an OIS magnet part serving as a component of the OIS voice coil motor, and sways in the XY plane at the time of shake correction. OIS fixing part 20 includes an OIS coil part. OIS movable part 10 includes an AF driving part.

OIS movable part 10 is disposed on the light reception side in the light axis direction relative to OIS fixing part 20 and is separated from OIS fixing part 20. OIS movable part 10 is coupled with OIS fixing part 20 by supporting member 30. To be more specific, supporting member 30 is composed of four suspension wires extending along the Z direction (hereinafter referred to as "suspension wire 30"). One end (upper end) of suspension wire 30 is fixed to OIS movable part 10 (upper elastic supporting part 13, see FIG. 5), and the other end (lower end) of suspension wire 30 is fixed to OIS fixing part 20 (coil substrate 21, see FIG. 6). OIS movable part 10 is supported by suspension wire 30 such that OIS movable part 10 can sway in the XY plane. Two of the four suspension wires 30 are used for feeding power to AF coil part 112 (see FIG. 5). It is to be noted that the number of suspension wires 30 is not limited, and five or more suspension wires 30 may be provided.

Figure 5:
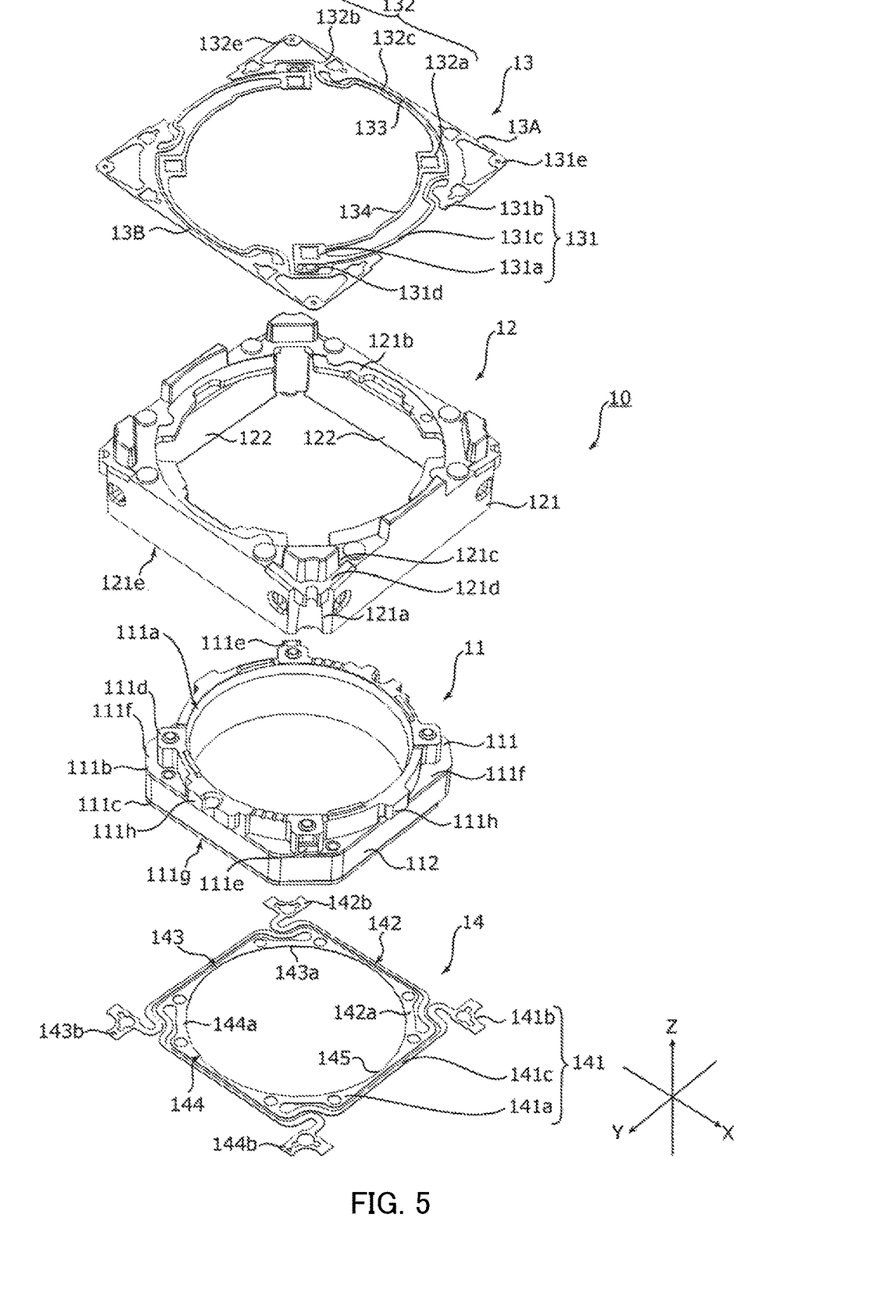
FIG. 5 is an exploded perspective view of an OIS movable part.

FIG. 5 is an exploded perspective view of OIS movable part 10. As illustrated in FIG. 5, OIS movable part 10 includes AF movable part 11, AF fixing part 12, upper elastic supporting part 13, lower elastic supporting part 14 and the like. AF movable part 11 includes an AF coil part serving as a component of an AF voice coil motor, and moves in the light axis direction at the time of focusing. AF fixing part 12 is a part having an AF magnet part. That is, the AF driving part of lens driving device 1 is of a moving coil type. AF movable part 11 is disposed on the radially inside relative to AF fixing part 12 and is separated from AF fixing part 12. AF movable part 11 is coupled with AF fixing part 12 by upper elastic supporting part 13 and lower elastic supporting part 14.

AF movable part 11 includes lens holder 111 and AF coil part 112.

Lens holder 111 is a member having a quadrangular cylindrical shape, and a lens part (not illustrated) is fixed to lens housing part 111*a* having a cylindrical shape by bonding or screwing. Lens holder 111 includes upper flange part 111*b* and lower flange part 111*c* on the peripheral surface of lens housing part 111*a*. AF coil part 112 is wound at a part (hereinafter referred to as "coil winding part") sandwiched between upper flange part 111*b* and lower flange part 111*c*.

Lens holder 111 includes, at positions corresponding to the four corners at an upper portion of the outer periphery of lens housing parts 111*a*, upper spring fixing part 111*d* for fixing upper elastic supporting part 13. Lens holder 111 includes tying parts 111*e* that protrude outward in a radial direction from two diagonally-opposite upper spring fixing parts 111*d* of four upper spring fixing parts 111*d*.

Top surface 111*f* of upper flange part 111*b* serves as a locking part for restricting movement of AF movable part 11 to the light reception side in the light axis direction (hereinafter referred to as "locking part 111*f*"). Lower elastic supporting part 14 is fixed to bottom surface 111*g* of lower flange part 111*c* (hereinafter referred to as "lower spring fixing part 111*g*").

Lens holder 111 includes, at opposite positions in the X direction and the Y direction of an upper portion of the outer periphery of lens housing part 111*a*, magnet locking parts 111*h* that protrude outward in a radial direction over upper flange part 111*b* and lower flange part 111*c*. The top surface of magnet part 122 (the surface on the light reception side in the light axis direction) makes contact with the bottom surface (the surface on the imaging side in the light axis direction) of magnet locking part 111*h*.

AF coil part 112 is an air-core coil that is energized at the time of focusing, and is wound around the outer peripheral surface of a coil winding part of lens holder 111. The both ends of AF coil part 112 are tied to tying parts 111*e* of lens holder 111.

AF fixing part 12 includes magnet holder 121 and magnet part 122. While FIG. 5 illustrates a state where magnet holder 121 is attached on magnet part 122, magnet part 122 is attached after AF movable part 11 is inserted to magnet holder 121 in practice.

Magnet holder 121 has a quadrangular cylindrical shape which is square in plan view. Four connection parts (four sides extending along the Z-axis direction) connecting the side walls of magnet holder 121 are recessed to radially inside in an arc-like shape. Suspension wire 30 is disposed at this portion (hereinafter referred to as "wire insertion part 121*a*"). With wire insertion part 121*a*, interference between suspension wire 30 and magnet holder 121 at the time when OIS movable part 10 sways is avoided.

Magnet holder 121 includes, at the upper portion, stopper parts 121*b* that protrude inward in the radial direction in a ring-shape. In stopper part 121*b*, the portions corresponding to upper spring fixing part 111*d* and magnet locking part 111*h* of lens holder 111 are cut out such that AF movable part 11 can move to the light reception side in the light axis direction relative to the top surface of magnet holder 121. When AF movable part 11 moves to the light reception side in the light axis direction, stopper part 121*b* makes contact with locking part 111*f* of lens holder 111, and thus the movement of AF movable part 11 to the light reception side in the light axis direction is restricted. In addition, arm parts 131*c* and 132*c* of upper elastic supporting part 13 are placed on the top surface of stopper part 121*b*. The top surface of magnet part 122 makes contact with the bottom surface of stopper part 121*b*.

Lower elastic supporting part 14 is fixed to bottom surface 121*e* of magnet holder 121 (hereinafter referred to as "lower spring fixing part 121*e*"). Magnet holder 121 includes, at the four corners of the upper portion, upper spring fixing parts 121*c* that fix upper elastic supporting part 13. The peripheral portion of the upper boss having a trapezoidal columnar shape disposed in upper spring fixing part 121*c* is slightly recessed from the top surface (the surface on which upper elastic supporting part 13 is attached) of magnet holder 121 such that a gap (damper installation part 121*d*) is formed when upper elastic supporting part 13 is attached. The corner (the portion provided continuously with the upper portion of wire insertion part 121*a*) of damper installation part 121*d* protrudes to the outside relative to the lower portion, and is cut out in an arc-like shape. The cut-out portion having an arc-like shape of damper installation part 121*d* forms a part of wire insertion part 121*a*.

Magnet part 122 includes four permanent magnets each having a cuboid shape. Magnet part 122 is disposed along the internal surface of each of the four side walls of magnet holder 121. Magnet parts 122 are magnetized such that a traversing magnetic field in the radial direction is formed at AF coil part 112. For example, magnet parts 122 are magnetized such that the inner periphery side and the outer periphery side thereof are set to N pole and S pole, respectively.

The AF voice coil motor is composed of magnet part 122 and AF coil part 112. In the present embodiment, magnet part 122 serves as the AF magnet part and as the OIS magnet part.

Upper elastic supporting part 13 is a leaf spring formed of beryllium copper, nickel copper, stainless-steel or the like, for example, and has a square shape as a whole in plan view. Upper elastic supporting part 13 elastically connects AF fixing part 12 (magnet holder 121) and AF movable part 11 (lens holder 111).

Upper elastic supporting part 13 is composed of two upper leaf springs 13A and 13B (upper elastic supporting members) which are disposed in a point-symmetrical manner about the light axis. Each of upper leaf springs 13A and 13B includes spring parts 131 and 132. Since the configurations of upper spring parts 13A and 13B are similar to each other, the description of upper leaf spring 13B is omitted.

In upper leaf spring 13A, spring part 131 includes lens holder fixing part 131*a* that is fixed to lens holder 111, magnet holder fixing part 131*b* that is disposed at a position at 90 degrees from lens holder fixing part 131*a* and is fixed to magnet holder 121, and arm part 131*c* that couples lens holder fixing part 131*a* and magnet holder fixing part 131*b*. In addition, lens holder fixing part 131*a* includes coil connecting part 131*d* that has a U-shape in plan view and is bonded by soldering to an end portion of AF coil part 112.

Likewise, spring part 132 includes lens holder fixing part 132*a* that is fixed to lens holder 111, magnet holder fixing part 132*b* that is disposed at a position at 90 degrees from lens holder fixing part 132*a* and is fixed to magnet holder 121, and arm part 132*c* that couples lens holder fixing part 132*a* and magnet holder fixing part 132*b*.

Lens holder fixing parts 131*a* and 132*a* are coupled by inner coupling part 134 at a position inside arm part 131*c*.

In addition, magnet holder fixing parts 131b and 132b are coupled by outer coupling part 133 at a position outside arm part 132c.

Each of lens holder fixing parts 131a and 132a has a shape corresponding to upper spring fixing part 111d of lens holder 111. When the positioning bosses of lens holder 111 are fitted into the fixing holes of lens holder fixing parts 131a and 132a, upper leaf springs 13A and 13B are positioned and fixed to lens holder 111. Coil connecting part 131d is electrically connected by soldering with coil part 112 tied to tying part 111e of lens holder 111.

Each of magnet holder fixing parts 131b and 132b has a shape corresponding to upper spring fixing part 121c of magnet holder 121. When the positioning bosses of upper spring fixing parts 121c are fitted into the fixing holes of magnet holder fixing parts 131b and 132b, upper leaf springs 13A and 13B are positioned and fixed to magnet holder 121. In addition, each of vertex parts 131e and 132e of magnet holder fixing parts 131b and 132b serves as a wire connecting part (hereinafter referred to as "wire connecting parts 131e and 132e") where suspension wire 30 is connected.

Wire connecting parts 131e and 132e are located on the light reception side of wire insertion part 121a of magnet holder 121 in the light axis direction. In the state where upper leaf springs 13A and 13B are attached to magnet holder 121, a gap is formed between damper installation part 121d and wire connecting parts 131e and 132e. A damper is disposed in this gap. In addition, each of wire connecting parts 131e and 132e has a shape which is easily elastically deformed. With deflection of wire connecting parts 131e and 132e and suspension wire 30, drop impact is absorbed. Thus, plastic deformation and rupture of suspension wire 30 with drop impact can be effectively prevented.

Arm parts 131c and 132c couple lens holder fixing part 131a and magnet holder fixing part 131b, and lens holder fixing part 132a and magnet holder fixing part 132b, respectively. Each of arm parts 131c and 132c is formed in an arc-like shape, and is elastically deformed when AF movable part 11 moves.

As with upper elastic supporting part 13, lower elastic supporting part 14 is a leaf spring (hereinafter referred to as "lower leaf spring 14") made of beryllium copper, nickel copper, stainless-steel or the like. Lower elastic supporting part 14 elastically connects AF fixing part 12 (magnet holder 121) and AF movable part 11 (lens holder 111).

Lower leaf spring 14 (lower elastic supporting member) includes four spring parts 141 to 144. Spring part 141 includes lens holder fixing part 141a that is fixed to lens holder 111, magnet holder fixing part 141b that is disposed at a position at 90 degrees from lens holder fixing part 141a and is fixed to magnet holder 121, and arm part 141c that couples lens holder fixing part 141a and magnet holder fixing part 141b. The configurations of spring parts 142 to 144 are similar to the above-mentioned configuration.

In lens holder fixing parts 141a to 144a, the lens holder fixing parts adjacent to each other are coupled with coupling part 145 to have a shape corresponding to lower spring fixing part 111g of lens holder 111. When the positioning bosses of lens holder 111 are fitted into the fixing holes of lens holder fixing parts 141a to 144a, lower leaf spring 14 is positioned and fixed to lens holder 111.

Magnet holder fixing parts 141b to 144b have shapes corresponding to lower spring fixing part 121e of magnet holder 121. When the positioning bosses of lower spring fixing part 121e are fitted into the fixing holes of magnet holder fixing parts 141b to 144b, and thus lower leaf spring 14 is positioned and fixed to magnet holder 121.

Figure 7A:
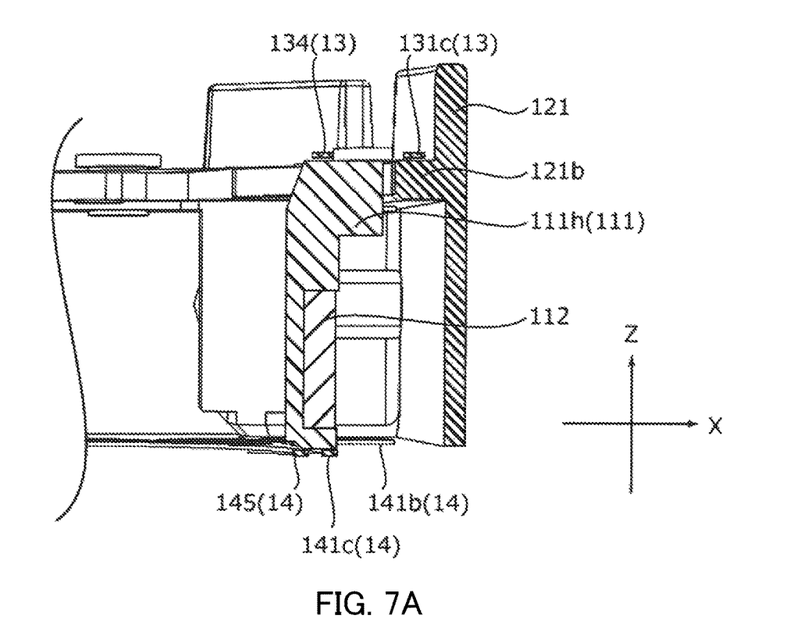
FIGS. 7A and 7B are sectional views illustrating a fixing structure of the OIS movable part (before the magnet part is attached)
Figure 7B:
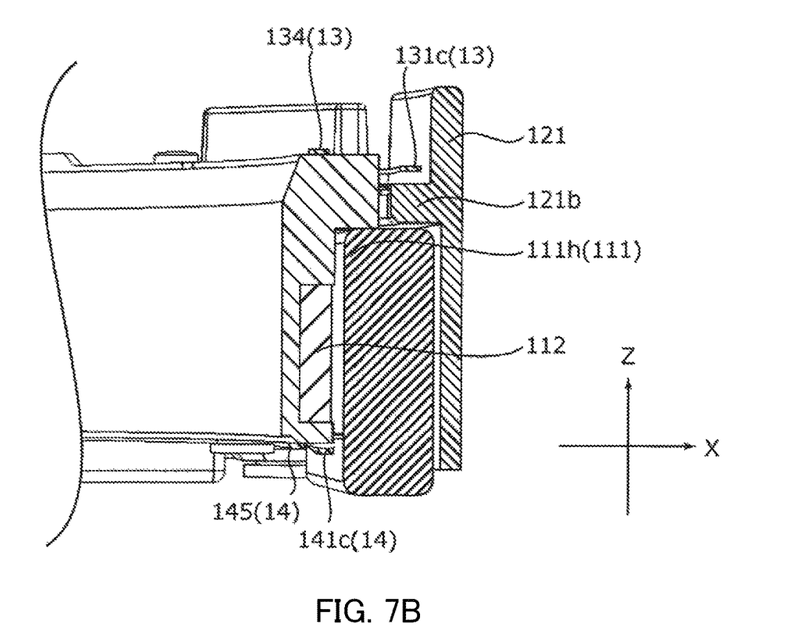

FIGS. 7A and 7B are sectional views illustrating a fixing structure of the OIS movable part along the Y direction. FIG. 7A illustrates a state before magnet part 122 is attached to magnet holder 121, and FIG. 7B illustrates a state after magnet part 122 is attached to magnet holder 121.

As illustrated in FIGS. 7A and 7B, when assembling OIS movable part 10 (AF driving part), first, magnet holder fixing parts 131b and 132b of upper leaf springs 13A and 13B are attached to upper spring fixing parts 121c of magnet holder 121. In addition, lens holder fixing parts 141a to 144a of lower leaf spring 14 are attached to lower spring fixing part 111g of lens holder 111.

Next, lens holder 111 is fitted into magnet holder 121 from the imaging side in the light axis direction. Then, lens holder fixing parts 131a and 132a of upper leaf springs 13A and 13B are attached to upper spring fixing parts 111d of lens holder 111. Coil connecting part 131d is bonded by soldering to the both ends of AF coil part 112 tied to tying part 111e of lens holder 111, so as to be electrically connected. In addition, magnet holder fixing parts 141b to 144b of lower leaf spring 14 are attached to lower spring fixing part 121e of magnet holder 121.

At this time, as illustrated in FIG. 7B, the upper spring attaching surface of lens holder 111 and the upper spring attaching surface of magnet holder 121 are flush with each other, and the lower spring attaching surface of lens holder 111 and the lower spring attaching surface of magnet holder 121 are also flush with each other. In addition, the bottom surface of magnet locking part 111h of lens holder 111 is located on the imaging side in the light axis direction relative to the bottom surface of stopper part 121b of magnet holder 121.

Next, as illustrated in FIG. 7B, magnet part 122 is inserted to magnet holder 121 from the imaging side in the light axis direction. The top surface of magnet part 122 makes contact with the bottom surface of magnet locking part 111h of lens holder 111, and lens holder 111 is pushed up by magnet part 122. With the top surface of magnet part 122 making contact with stopper part 121b of magnet holder 121, magnet part 122 is bonded to magnet holder 121. Arm parts 131c and 132c of upper elastic supporting part 13 and arm parts 141c to 144c of lower elastic supporting part 14 are deflected.

That is, when magnet part 122 (AF magnet part) is fixed to a predetermined position of magnet holder 121 (a position where the top surface makes contact with the stopper part 121b), lens holder 111 is pushed up to the light reception side in the light axis direction, and biased to the imaging side in the light axis direction by upper leaf springs 13A and 13B (upper elastic supporting members) and lower leaf spring 14 (lower elastic supporting member). In OIS movable part 10, AF movable part 11 (lens holder 111) is fixed to AF fixing part 12 (magnet holder 121) by magnet part 122 without using a spacer unlike the conventional structure (see PTL 1). In this manner, OIS movable part 10 (AF driving part) is assembled.

Figure 6:
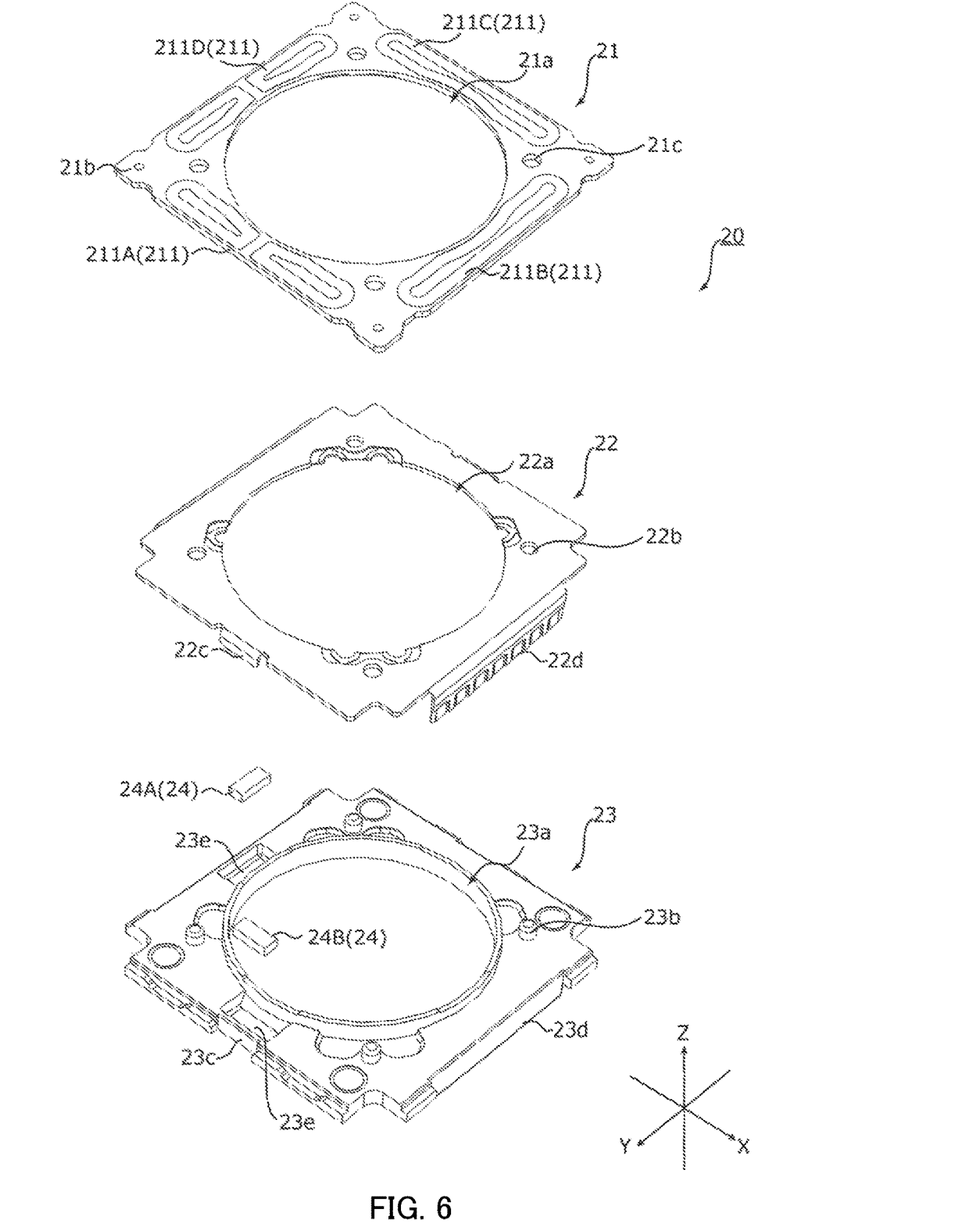
FIG. 6 is an exploded perspective view of an OIS fixing part.

FIG. 6 is an exploded perspective view of OIS fixing part 20. As illustrated in FIG. 6, OIS fixing part 20 includes coil substrate 21, sensor substrate 22, base member 23, position detection part 24 and the like.

In plan view, coil substrate 21 has a square shape, and has circular opening 21a at a center portion. Coil substrate 21 includes, at the four corners, wire fixing holes 21b through which the other end (lower end) of suspension wire 30 is inserted. In addition, coil substrate 21 includes positioning holes 21c at positions which intersect the diagonal direction of peripheral portions of opening 21a.

Coil substrate 21 includes OIS coil part 211 at a position opposite to magnet part 122 in the light axis direction. OIS coil part 211 includes four OIS coils 211A to 211D corresponding to magnet parts 122. The sizes and positions of OIS coil part 211 and magnet part 122 and magnet parts 122 are set such that the magnetic field radiated from the bottom surfaces of magnet parts 122 traverses the long side portions of OIS coils 211A to 211D in the Z direction. The OIS voice coil motor is composed of magnet part 122 and OIS coil part 211.

As with coil substrate 21, sensor substrate 22 has a square shape in plan view, and has circular opening 22a at a center portion. Sensor substrate 22 includes, at peripheral portions of opening 22a, positioning holes 22b at positions corresponding to positioning holes 21c of coil substrate 21. Sensor substrate 22 includes, at the two sides along the X direction, ground terminals 22c that are bent downward. In addition, sensor substrate 22 includes, at two sides along the Y direction, control terminals 22d that are bent downward.

Sensor substrate 22 includes a power-source line (not illustrated) for power feeding to AF coil part 112 and OIS coil part 211, and a signal line (not illustrated) for a detection signal output from position detection part 24. On the rear surface of sensor substrate 22, position detection part 24 that detects the position of OIS movable part 10 in the XY plane is disposed.

Position detection part 24 is composed of Hall devices 24A and 24B (magnetic sensors) that detect the magnetic field by utilizing Hall effect, for example. Hall devices 24A and 24B are respectively disposed at adjacent two sides of the bottom surface of sensor substrate 22, at an approximate center thereof. By detecting the magnetic field formed by magnet part 122 with Hall devices 24A and 24B, the position of OIS movable part 10 in the XY plane can be specified. It is to be noted that a magnet for position detection may be disposed independently of magnet part 122 in OIS movable part 10.

As with coil substrate 21, base member 23 has a square shape in plan view, and has circular opening 23a at a center portion. Base member 23 includes, at peripheral portions of opening 23a, positioning bosses 23b at positions corresponding to positioning holes 21c of coil substrate 21 and positioning holes 22b of sensor substrate 22. In addition, base member 23 includes, at peripheral portions of opening 23a, Hall device housing parts 23e at positions corresponding to Hall devices 24A and 24B.

In addition, at the peripheral portion, base member 23 includes first recess 23c at a position corresponding to ground terminal 22c of sensor substrate 22, and second recess 23d at a position corresponding to control terminal 22d. First recess 23c and second recess 23d are formed in a tapered shape expanding outward toward the lower side.

At the time of assembling OIS fixing part 20, first, coil substrate 21 and sensor substrate 22 are bonded by soldering. In this manner, the power-source line (not illustrated) of sensor substrate 22 and OIS coil part 211 are electrically connected to each other.

Next, positioning holes 21c of coil substrate 21 and positioning holes 22b of sensor substrate 22 are fitted to positioning bosses 23b of base member 23, to dispose coil substrate 21 and sensor substrate 22 on base member 23. When ground terminal 22c of sensor substrate 22 is engaged with first recess 23c of base member 23, and control terminal 22d is engaged with second recess 23d, coil substrate 21 and sensor substrate 22 are fixed to base member 23. In this manner, OIS fixing part 20 is assembled.

At the time of assembling lens driving device 1, one end (upper end) of suspension wire 30 is inserted to wire connecting part 131e of upper leaf springs 13A and 13B and is fixed by soldering. In this manner, suspension wire 30 and upper leaf springs 13A and 13B are electrically connected to each other.

In addition, the other end (lower end) of suspension wire 30 is inserted to wire fixing hole 21b of coil substrate 21 and is fixed by soldering. In this manner, suspension wire 30 and the power-source line of sensor substrate 22 are electrically connected to each other. Through suspension wire 30 and upper leaf springs 13A and 13B, power can be fed to AF coil part 112.

In addition, a damper (not illustrated) is disposed at damper installation part 121d (including upper portion of wire insertion part 121a) of magnet holder 121 in such a manner as to surround suspension wire 30. Thus the damper is interposed between magnet holder 121 and upper leaf springs 13A and 13B. By interposing the damper (not illustrated) between magnet holder 121 and upper leaf springs 13A and 13B, generation of unnecessary resonance (high-order resonance mode) can be reduced, and consequently, the stability of the operation can be ensured. The damper can be readily applied to damper installation part 121i by use of a dispenser. For example, ultraviolet curing silicone gel can be adopted as the damper.

Shield cover 2 is attached to lens driving device 1 such that a lower end portion of shield cover 2 makes contact with ground terminal 22c of sensor substrate 22. With first recess 23c of base member 23 having a tapered shape, a biasing force is generated between ground terminal 22c of sensor substrate 22 and a lower end portion of shield cover 2. Accordingly, shield cover 2 and sensor substrate 22 are electrically connected to each other without soldering. In this manner, shield cover 2 can be readily grounded, and EMC noise can be blocked.

In lens driving device 1, when AF coil part 112 is energized, a Lorentz force is generated at AF coil part 112 by interaction between the magnetic field of magnet part 122 and the current flowing through AF coil part 112. The direction of the Lorentz force is the direction (the Z direction) orthogonal to the direction of the magnetic field (X direction or Y direction) and the direction of the current flowing through the AF coil part 211 (the Y direction or the X direction). Since magnet part 122 is fixed, a reactive force acts on AF coil part 112. With this reactive force serving as the driving force of the AF voice coil motor, AF movable part 11 including AF coil part 112 moves in the light axis direction, and thus focusing is performed.

In the present embodiment, in an non-energization state where focusing is not performed, AF movable part 11 is held in a state where a back tension is caused in upper leaf springs 13A and 13B and lower leaf spring 14. This state is the infinity position. At the time of focusing, the direction of the current is controlled such that AF movable part 11 is moved from the infinity position to the macro position side. In addition, the value of the current is controlled based on the movement length of AF movable part 11.

In lens driving device 1, when OIS coil part 211 is energized, a Lorentz force is generated at OIS coil part 211 by interaction between the magnetic field of magnet part 122 and the current flowing through OIS coil part 211 (Fleming's left hand rule). The direction of the Lorentz force is the direction (the Y direction or the X direction) orthogonal to the direction of the magnetic field (the Z direction) and to the direction of the current flowing through the long side portion of OIS coil part 211 (the X direction or the Y direction).

Since OIS coil part 211 is fixed, a reactive force acts on magnet part 122. With this reactive force serving as the driving force of the OIS voice coil motor, OIS movable part 10 including magnet part 122 sways in the XY plane, and thus shake correction is performed.

As described above, lens driving device 1 of the embodiment includes OIS movable part 10 (AF driving part) including AF coil part 112 disposed at a periphery of a lens part (not illustrated), and magnet part 122 (AF magnet part) disposed separately from AF coil part 112 in a radial direction, OIS movable part 10 being configured to perform automatic focusing by moving, with respect to AF fixing part 12 including magnet part 122, AF movable part 11 including AF coil part 112 in a light axis direction by use of a driving force of a voice coil motor composed of AF coil part 112 and magnet part 122; and OIS fixing part 20 (base part) disposed separately from OIS movable part 10 at a position on an imaging side in the light axis direction. OIS movable part 10 includes upper elastic supporting part 13 and lower elastic supporting part 14 (upper elastic supporting part) configured to connect AF movable part 11 and AF fixing part 12, and AF movable part 11 is fixed to AF fixing part 12 in a state where AF movable part 11 is pushed up by magnet part 122 to a light reception side in the light axis direction, and biased by upper elastic supporting part 13 and lower elastic supporting part 14 to the imaging side in the light axis direction.

Lens driving device 1 includes OIS driving part including magnet part 122 (AF magnet part) disposed in OIS movable part 10 (AF driving part), and OIS coil part 211 disposed in OIS fixing part 20 (base part), the OIS driving part being configured to perform shake correction by swaying, with respect to OIS fixing part 20 including OIS coil part 211, OIS movable part 10 including magnet part 122 in a plane orthogonal to the light axis direction by use of a driving force of a voice coil motor composed of OIS coil part 211 and magnet part 122.

With lens driving device 1, AF movable part 11 (lens holder 111) is pushed up by magnet part 122, and is fixed in a state where a back tension is caused in upper elastic supporting part 13 and lower elastic supporting part 14, and thus the spacer of the conventional structure is unnecessary. With this configuration, the spacer can be omitted, and accordingly the distance of OIS movable part 10 from OIS fixing part 20 can be reduced, and thus reduction in size and height can be achieved. Naturally, it is also possible to reduce the component cost.

In a conventional structure, the spacer is joined to the fixing boss provided in the magnet holder by thermal caulking (fusing), and consequently there is a possibility of dropping off of the spacer due to fracture of the joining part (heat caulking part) by drop impact or the like. Lens driving device 1 solves such a problem. In addition, since the fixing boss for fixing the spacer disposed at the magnet holder is unnecessary, the degrees of freedom in design of lower elastic supporting part 14 is high. It is also possible to increase the thickness of lower elastic supporting part 14 in comparison with the conventional structure, to achieve a structure which causes less disconnection due to drop impact. Accordingly, the reliability of lens driving device 1 is further improved.

Furthermore, since the weight of lens driving device 1 can be reduced, the power consumption for driving can be reduced, and response sensitivity can be increased. While the weight of the lens part can possibly be increased in the future due to the demand of increasing pixel count, the present invention is very useful for such a situation.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while the lens driving device has an AF function and an OIS function in the embodiment, the present invention is applicable to a lens driving device having an AF function.

While a smartphone serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a webcamera, and a camera-equipped in-vehicle apparatus (for example, a rear-view monitor apparatus or a drive recorder apparatus). In addition, the camera mounting device serving as a transport apparatus is a transport apparatus including a camera module and a control section that processes an image obtained with the camera module, such as an automobile.

Figure 8A:
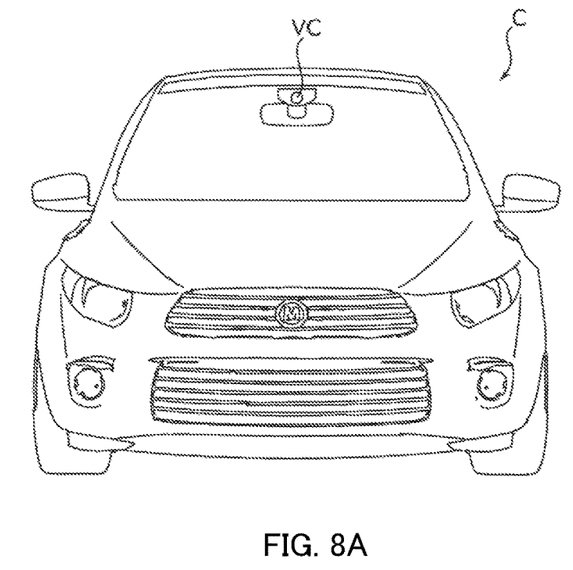
FIGS. 8A and 8B illustrate an automobile serving as a camera mounting device in which an in-vehicle camera module is mounted.
Figure 8B:
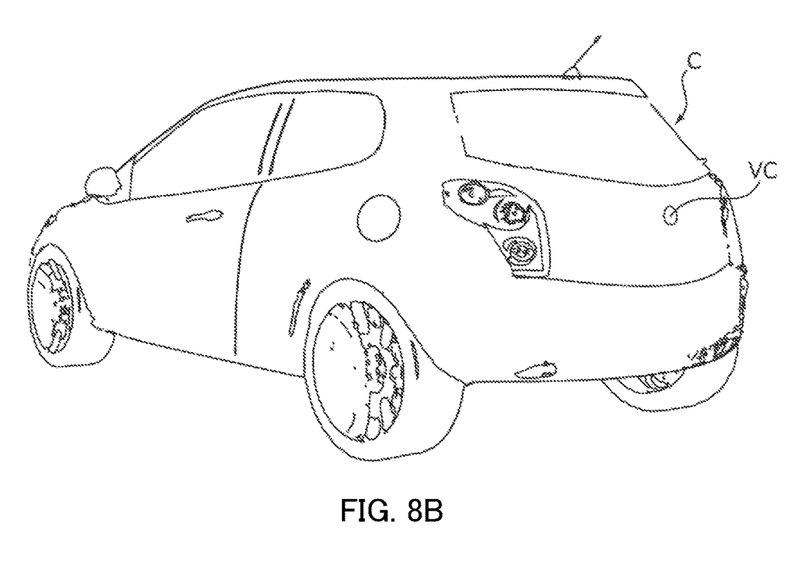

FIGS. 8A and 8B illustrate automobile C serving as a camera mounting device in which an in-vehicle camera module vehicle camera (VC) is mounted. FIG. 8A is a front view of automobile C, and FIG. 8B is a rear perspective view of automobile C. In automobile C, camera module A described in the embodiment is mounted as in-vehicle camera module VC. As illustrated in FIGS. 8A and 8B, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This application is entitled to and claims the benefit of Japanese Patent Application No. 2014-262814 dated Dec. 25, 2014, the disclosure of which including the specification, drawings and abstract is incorporated herein by reference in its entirety.

REFERENCE SIGNS LIST

1 Lens driving device
2 Shield cover
10 OIS movable part (AF driving part, shake correction movable part)
11 AF movable part
111 Lens holder
112 AF coil part
12 AF fixing part
121 Magnet holder
122 Magnet part (AF magnet part, OIS magnet part)

13 Upper elastic supporting part
13A, 13B Upper leaf spring (Upper elastic supporting member)
14 Lower elastic supporting part, Lower leaf spring (Lower elastic supporting member)
20 OIS fixing part (base part, shake correction fixing part)
21 Coil substrate
211 OIS coil part
211A to 211D OIS coil
22 Sensor substrate
23 Base member
24 Position detection part
24A, 24B Hall device
30 Supporting member
M Smartphone
A Camera module

The invention claimed is:

1. A lens driving device comprising:
an auto-focusing driving part; and
a base part disposed separately from the auto-focusing driving part at a position on an imaging side in a light axis direction,
wherein the auto-focusing driving part includes:
an auto focus movable part including a lens holder and an auto-focusing coil part, the lens holder being configured to hold a lens barrel, the auto-focusing coil part being disposed at the lens holder,
an auto focus fixing part including an auto-focusing magnet part including a magnet holder and an auto-focusing magnet part, the magnet holder having a frame shape, the auto-focusing magnet part being disposed at the magnet holder, wherein the auto focus fixing part is disposed separately from the auto focus movable part outward in a radial direction, and
an elastic supporting part configured to elastically connect the lens holder and the magnet holder, and
wherein the auto-focusing driving part performs automatic focusing by moving the auto focus movable part in the light axis direction with respect to the auto focus fixing part by use of a driving force of a voice coil motor composed of the auto-focusing coil part and the auto-focusing magnet part, and
wherein the auto focus movable part is fixed to the auto focus fixing part in a state where the auto focus movable part is pushed up by the auto-focusing magnet part to a light reception side in the light axis direction, and biased by the elastic supporting part to the imaging side in the light axis direction, the auto focus movable part being pushed up by fixing of the auto-focusing magnet to a predetermined position of the magnet holder in a state where a surface of the auto-focusing magnet part on the light reception side in the light axis direction is in contact with a surface of the lens holder on the imaging side in the light axis direction.

2. The lens driving device according to claim 1 further comprising:
a shake-correcting driving part including a shake-correcting magnet part disposed in the auto-focusing driving part, and a shake-correcting coil part disposed in the base part, the shake-correcting driving part being configured to perform shake correction by swaying, with respect to a shake correction fixing part including the shake-correcting coil part, a shake correction movable part including the shake-correcting magnet part in a plane orthogonal to the light axis direction by use of a driving force of a voice coil motor composed of the shake-correcting coil part and the shake-correcting magnet part.

3. The lens driving device according to claim 1, wherein:
the elastic supporting part includes an upper elastic supporting member configured to elastically connect an upper portion of the lens holder and an upper portion of the magnet holder, and a lower elastic supporting member configured to elastically connect a lower portion of the lens holder and a lower portion of the magnet holder; and
when the auto-focusing magnet part is fixed to a predetermined position of the magnet holder, the lens holder is pushed up to the light reception side in the light axis direction, and biased to the imaging side in the light axis direction by the upper elastic supporting member and the lower elastic supporting member.

4. The lens driving device according to claim 3, wherein:
the lens holder includes at an upper portion thereof a magnet locking part protruding outward in a radial direction over the auto-focusing coil part; and
a surface of the magnet locking part on the imaging side in the light axis direction makes contact with a surface of the auto-focusing magnet part on the light reception side in the light axis direction.

5. A camera module comprising:
the lens driving device according to claim 1;
a lens part mounted to the auto focus movable part; and
an image capturing part configured to capture a subject image imaged with the lens part.

6. A camera mounting device that is an information apparatus or a transport apparatus, the camera mounting device comprising the camera module according to claim 5.

* * * * *